US012626327B2

(12) United States Patent
Lin et al.

(10) Patent No.: US 12,626,327 B2
(45) Date of Patent: May 12, 2026

(54) IMAGE TRANSMISSION METHOD AND DEVICE, IMAGE DISPLAY METHOD AND DEVICE, AND SYSTEM

(71) Applicant: Arashi Vision Inc., Shenzhen (CN)

(72) Inventors: Dahao Lin, Shenzhen (CN); Xiaoshen Tian, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 0 days.

(21) Appl. No.: 19/074,517

(22) Filed: Mar. 10, 2025

(65) Prior Publication Data

US 2025/0209567 A1      Jun. 26, 2025

Related U.S. Application Data

(63) Continuation of application No. PCT/CN2023/117974, filed on Sep. 11, 2023.

(30) Foreign Application Priority Data

Sep. 13, 2022     (CN) .......................... 202211108814.8

(51) Int. Cl.
*G06T 3/4038*         (2024.01)
*G06T 3/60*           (2024.01)
        (Continued)
(52) U.S. Cl.
CPC .............. *G06T 3/4038* (2013.01); *G06T 3/60* (2013.01); *G06T 7/11* (2017.01); *H04N 7/183* (2013.01);
        (Continued)

(58) Field of Classification Search
None
See application file for complete search history.

(56) References Cited

U.S. PATENT DOCUMENTS

| | | | | | |
|---|---|---|---|---|---|
| 9,990,753 | B1 * | 6/2018 | Cai | ...................... | G06V 10/443 |
| 10,110,814 | B1 * | 10/2018 | Day | ...................... | G06V 20/40 |

(Continued)

FOREIGN PATENT DOCUMENTS

| | | | | | |
|---|---|---|---|---|---|
| CN | 104112280 | A | * | 10/2014 | ............. G06V 20/13 |
| CN | 107105218 | A | | 8/2017 | |

(Continued)

OTHER PUBLICATIONS

Translation CN 108322727 (Year: 2018).*

(Continued)

*Primary Examiner* — Ricky Chin
(74) *Attorney, Agent, or Firm* — XSENSUS LLP

(57)         ABSTRACT

An image transmission method comprises obtaining a spherical panoramic image based on a wide-angle image acquired from a target environment; obtaining an image of interest by cropping the spherical panoramic image based on a preset field of view and an Euler angle corresponding to a rotation attitude of a target object when using a virtual reality device; stitching the image of interest and a down-sampled wide-angle image to obtain a stitched image; the down-sampled wide-angle image being obtained by down-sampling the wide-angle image; and transmitting the stitched image to the virtual reality device.

19 Claims, 9 Drawing Sheets

(51) Int. Cl.
    *G06T 7/11*          (2017.01)
    *H04N 7/18*         (2006.01)
    *H04N 23/698*     (2023.01)

(52) U.S. Cl.
    CPC . *H04N 23/698* (2023.01); *G06T 2207/10032*
             (2013.01); *G06T 2207/20132* (2013.01)

(56)             References Cited

U.S. PATENT DOCUMENTS

| | | | | |
|---|---|---|---|---|
| 11,006,041 B1 * | 5/2021 | Ma | | H04N 23/698 |
| 2016/0044276 A1 * | 2/2016 | Shearman | | A42B 3/042 |
| | | | | 348/207.1 |
| 2016/0343107 A1 * | 11/2016 | Newman | | G06T 3/00 |
| 2022/0198695 A1 * | 6/2022 | Luo | | G06V 20/64 |
| 2022/0303455 A1 * | 9/2022 | Park | | H04N 23/61 |
| 2022/0405587 A1 * | 12/2022 | Rangarajan | | G06V 10/235 |
| 2025/0005848 A1 * | 1/2025 | Wang | | G06T 15/506 |
| 2025/0077061 A1 * | 3/2025 | Lin | | B64U 10/14 |
| 2025/0209567 A1 * | 6/2025 | Lin | | G06T 19/00 |

FOREIGN PATENT DOCUMENTS

| | | | | | |
|---|---|---|---|---|---|
| CN | 107959844 A | * | 4/2018 | | H04N 13/194 |
| CN | 108322727 A | * | 7/2018 | | |
| CN | 110853073 A | | 2/2020 | | |

OTHER PUBLICATIONS

International Search Report and Written Opinion mailed on Dec. 5, 2023, received for PCT Application PCT/CN2023/117974, filed on Sep. 11, 2023, 8 pages including English Translation.

\* cited by examiner

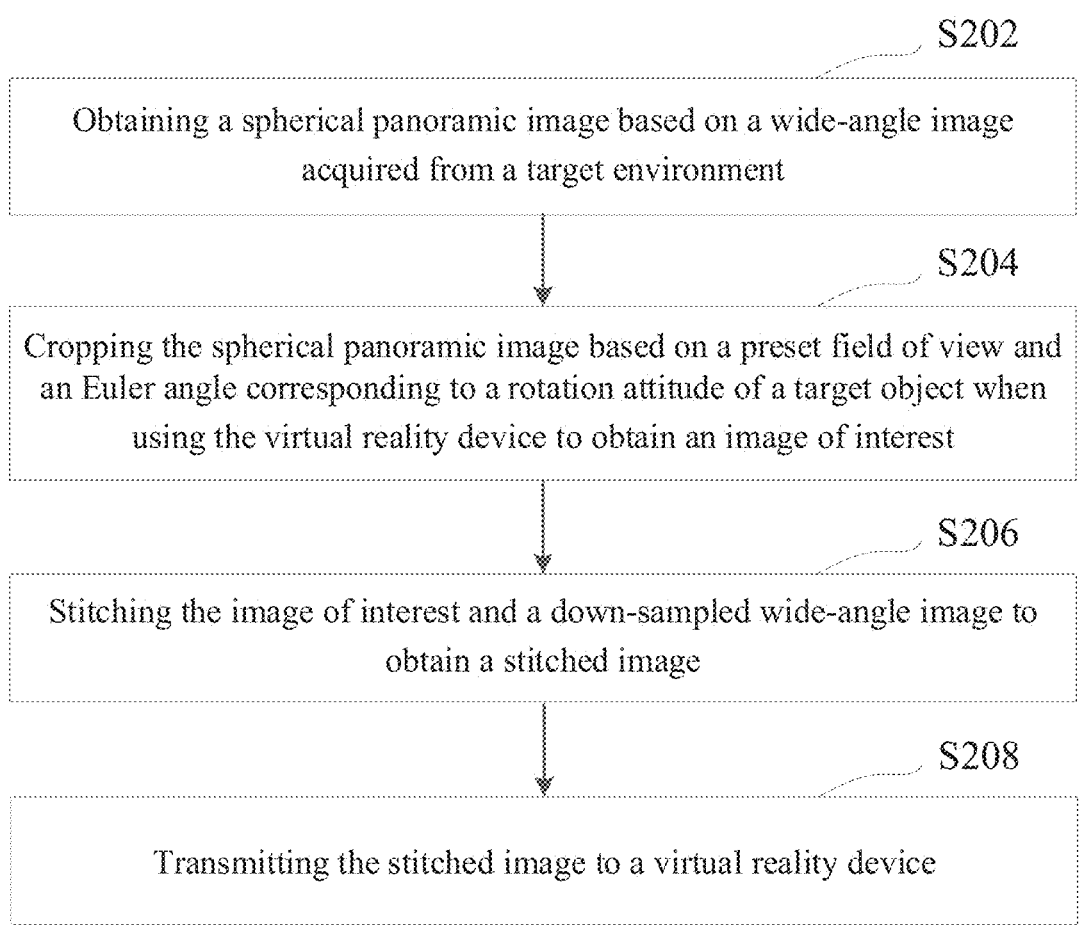

S202

Obtaining a spherical panoramic image based on a wide-angle image acquired from a target environment

S204

Cropping the spherical panoramic image based on a preset field of view and an Euler angle corresponding to a rotation attitude of a target object when using the virtual reality device to obtain an image of interest

S206

Stitching the image of interest and a down-sampled wide-angle image to obtain a stitched image

S208

Transmitting the stitched image to a virtual reality device

Fig. 2

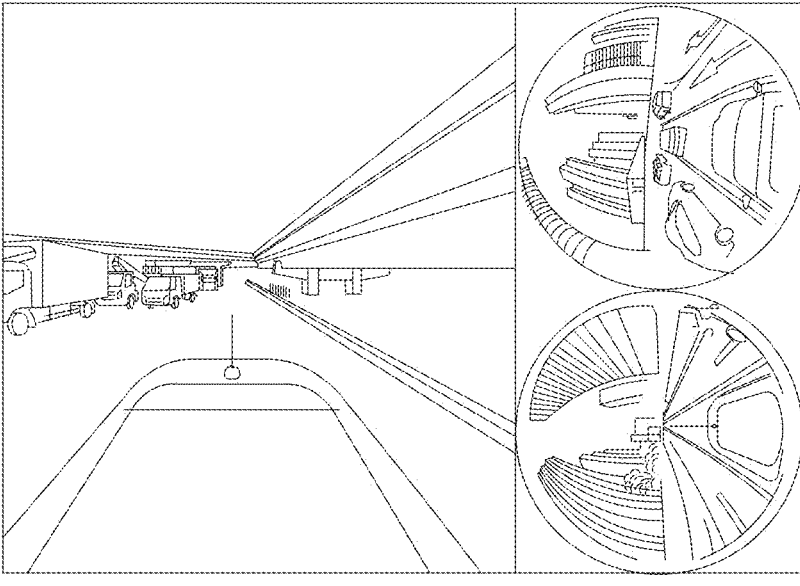

Fig. 3

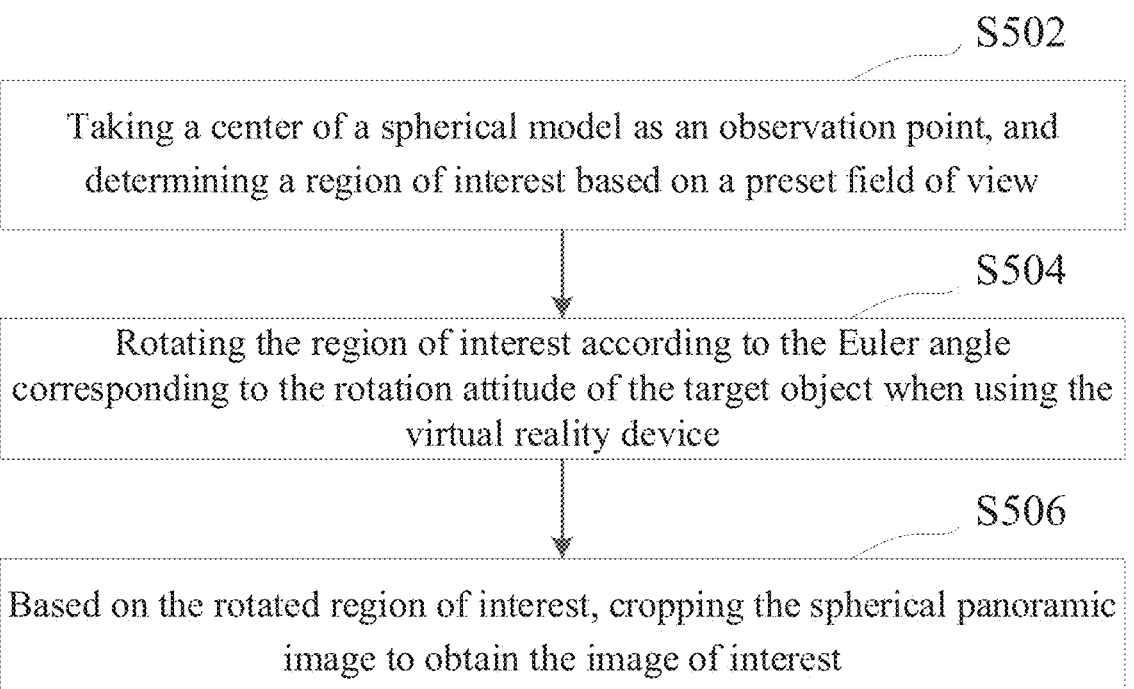

S502

Taking a center of a spherical model as an observation point, and determining a region of interest based on a preset field of view

S504

Rotating the region of interest according to the Euler angle corresponding to the rotation attitude of the target object when using the virtual reality device

S506

Based on the rotated region of interest, cropping the spherical panoramic image to obtain the image of interest

Fig. 5

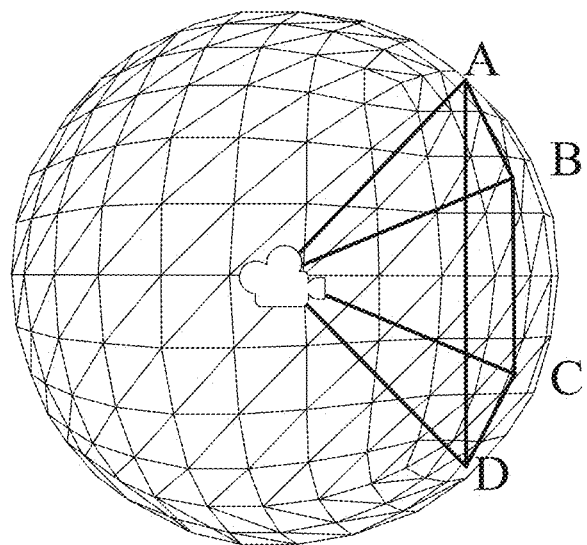

Fig. 6

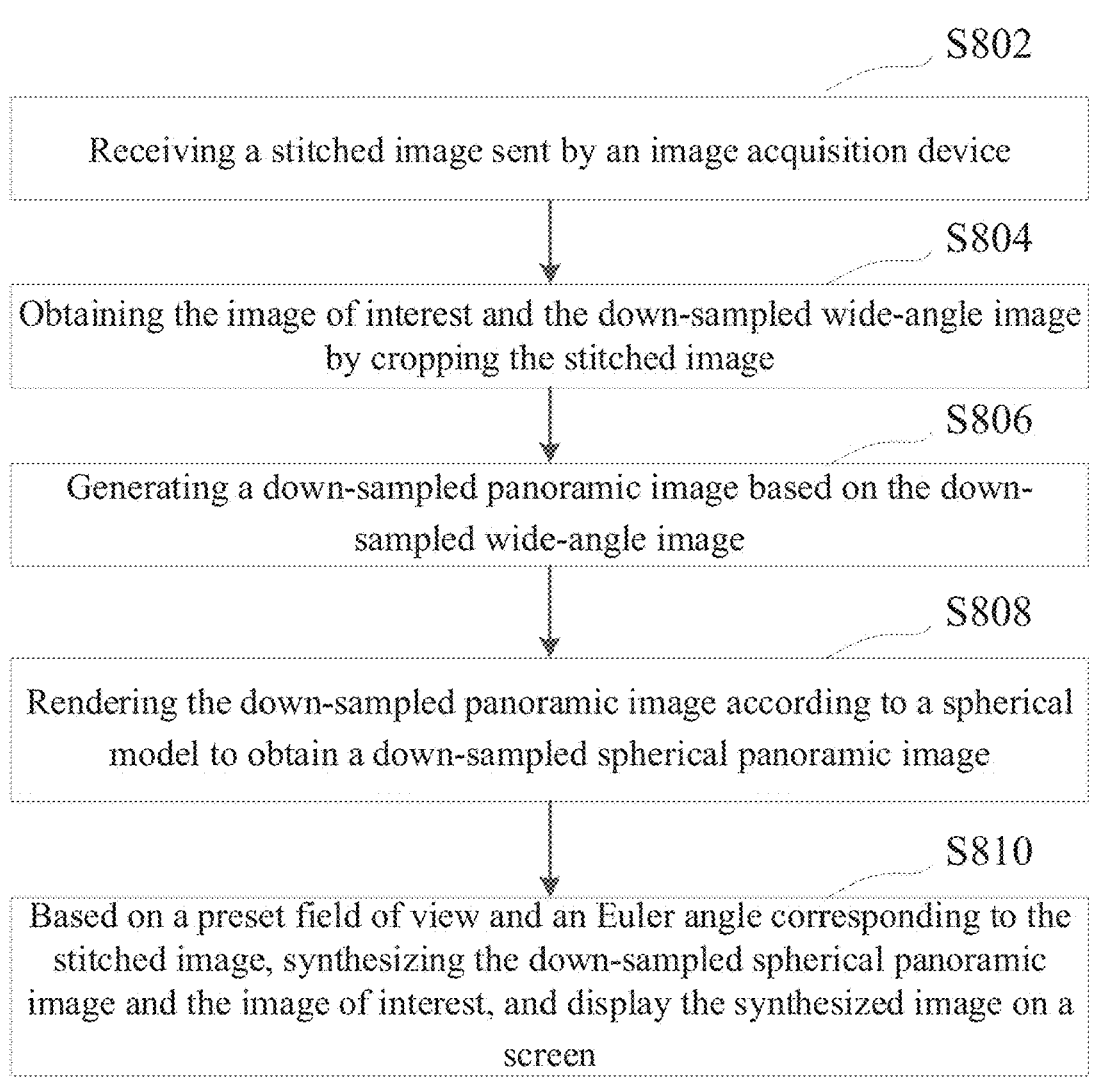

S802

Receiving a stitched image sent by an image acquisition device

S804

Obtaining the image of interest and the down-sampled wide-angle image by cropping the stitched image

S806

Generating a down-sampled panoramic image based on the down-sampled wide-angle image

S808

Rendering the down-sampled panoramic image according to a spherical model to obtain a down-sampled spherical panoramic image

S810

Based on a preset field of view and an Euler angle corresponding to the stitched image, synthesizing the down-sampled spherical panoramic image and the image of interest, and display the synthesized image on a screen

Fig. 8

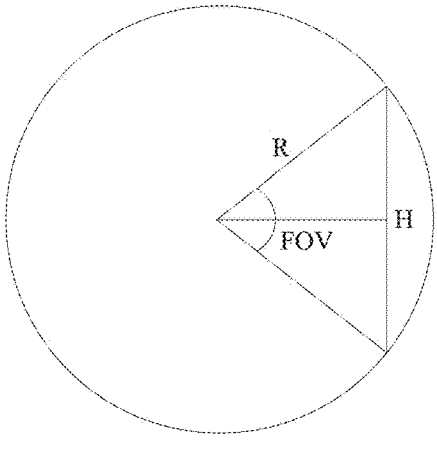

Fig. 9

IMAGE TRANSMISSION METHOD AND DEVICE, IMAGE DISPLAY METHOD AND DEVICE, AND SYSTEM

CROSS-REFERENCE TO RELATED APPLICATIONS

The present application is a continuation of International Application No. PCT/CN2023/117974, filed Sep. 11, 2023, which claims priority of Chinese Patent Application No. 202211108814.8, filed Sep. 13, 2022, the entire content of both of which being incorporated herein by reference in its entirety.

TECHNICAL OF FIELD

The present application relates to a field of computer technology, and in particular to an image transmission method and apparatus, an image display method and apparatus, a computer device, a storage medium, and a computer program product.

BACKGROUND

With the development of computer technology, application of virtual reality technology is becoming more and more widespread. In a virtual reality mode, in order for a user to watch high-definition images, it is necessary to transmit panoramic resources with a large amount of data to a virtual reality device, which requires a large transmission bandwidth.

SUMMARY

Based on this, it is necessary to provide an image transmission method, image display method, and a system that can reduce the transmission bandwidth in order to solve the above and other technical problems.

In a first aspect, the present application provides an image transmission method. The method comprises obtaining a spherical panoramic image based on a wide-angle image acquired from a target environment; obtaining an image of interest by cropping the spherical panoramic image based on a preset field of view and an Euler angle corresponding to a rotation attitude of a target object when using a virtual reality device; stitching the image of interest and a down-sampled wide-angle image to obtain a stitched image; the down-sampled wide-angle image being obtained by down-sampling the wide-angle image; and transmitting the stitched image to the virtual reality device.

In a second aspect, the present application provides an image display method. The method comprises: receiving a stitched image transmitted from an image acquirer, the stitched image comprising an image of interest and a down-sampled wide-angle image; obtaining the image of interest and the down-sampled wide-angle image by cropping the stitched image; generating a down-sampled panoramic image based on the down-sampled wide-angle image; rendering the down-sampled panoramic image according to a spherical model to obtain a down-sampled spherical panoramic image; synthesizing the down-sampled spherical panoramic image and the image of interest to obtain a synthesized image based on a preset field of view and an Euler angle corresponding to the stitched image; and displaying the synthesized image on a screen.

In a third aspect, the present application provides a system. The system includes an image acquirer, wherein the image acquirer comprises first circuitry configured to: obtain a spherical panoramic image based on a wide-angle image acquired from a target environment; obtain an image of interest by cropping the spherical panoramic image based on a preset field of view and an Euler angle corresponding to a rotation attitude of a target object when using a virtual reality device; stitch the image of interest and a down-sampled wide-angle image to obtain a stitched image; the down-sampled wide-angle image being obtained by down-sampling the wide-angle image; and transmit the stitched image to the virtual reality device.

In a fourth aspect, the system may further include an image display, wherein the image display comprises second circuitry configured to receive the stitched image transmit from the image acquirer; obtain the image of interest and the down-sampled wide-angle image by cropping the stitched image; generate a down-sampled panoramic image based on the down-sampled wide-angle image; render the down-sampled panoramic image according to a spherical model to obtain a down-sampled spherical panoramic image; synthesize the down-sampled spherical panoramic image and the image of interest to obtain a synthesized image based on the preset field of view and the Euler angle corresponding to the stitched image; and display the synthesized image on a screen.

BRIEF DESCRIPTION OF THE DRAWINGS

In order to more clearly illustrate the technical solutions in the embodiments of the present disclosure, the accompanying drawings to be used in the embodiments will be briefly introduced below, and it will be obvious that the accompanying drawings in the following description are only some of the embodiments of the present disclosure, and that for the person of ordinary skill in the field, other accompanying drawings can be obtained based on these drawings, without giving creative labor.

FIG. 2 is a diagram showing an image transmission method according to one embodiment;

FIG. 3 is a schematic diagram of an image arrangement mode according to one embodiment;

FIG. 5 is a schematic diagram of a process of obtaining an image of interest according to one embodiment;

FIG. 6 is a schematic diagram of a spherical model according to one embodiment;

FIG. 8 is a diagram of an image display method according to one embodiment;

FIG. 9 is a schematic diagram of a side length of a plane model according to one embodiment;

DETAILED DESCRIPTION

In order to make the purpose, technical solution and advantages of the present application more clearly understood, the present application is further described in detail below in conjunction with the accompanying drawings and embodiments. It should be understood that the specific embodiments described herein are only used to explain the present application and are not used to limit the present application.

Figure 1:
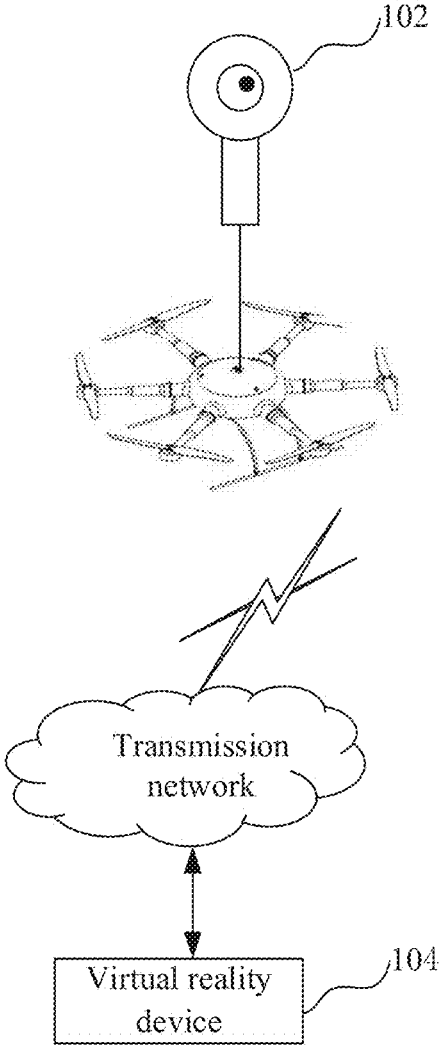
FIG. 1 is a diagram showing an application environment of an image transmission method according to one embodiment.

An image transmission method provided by one embodiment of the present application can be applied in an application environment shown in FIG. 1. Among them, an image acquisition device or acquirer 102 obtains a spherical panoramic image based on a wide-angle image acquired from a target environment; based on a preset field of view and an Euler angle corresponding to a rotation attitude of an target object when using a virtual reality device, the spherical panoramic image is cropped to form an image of interest; the image of interest is stitched with a down-sampled wide-angle image to obtain a stitched image; the down-sampled wide-angle image is obtained by down-sampling the wide-angle image; an image data packet is generated based on the stitched image, and the image data packet is transmitted to the virtual reality device 104. Among them, the image acquisition device 102 can be one of various devices with image acquisition functions, such as ordinary cameras, photographing heads, panoramic cameras, sports cameras, etc. The image acquisition device 102 can be mounted on a moving object such as an unmanned aerial vehicle (UAV), a robot, or an autonomous driving tool, or can also be installed at a fixed position. The virtual reality (VR) device 104 may be a computer device that can simulate a real scene in a three-dimensional dynamic form, including a VR device such as a VR all-in-one machine and a VR box that can be installed in a mobile phone. It may be used to perform system simulation of multi-source information fusion, interactive three-dimensional dynamic vision and entity behavior, so that a user can immerse himself or herself in a system simulation environment.

In one embodiment, as shown in FIG. 2, an image transmission method is provided, which is described by taking the method applied to the image acquisition device in FIG. 1 as an example, and includes the following steps:

S202: obtaining a spherical panoramic image based on a wide-angle image acquired from a target environment. The target environment is an environment in which the image acquisition device performs image acquisition. For example, the target environment may be an aerial photography environment of a UAV, or the target environment may be a driving environment of an autonomous driving tool, or the target environment may also be a monitoring environment, etc. A wide-angle image is an image taken by a wide-angle lens, an ultra-wide-angle lens, or a fisheye lens. A fisheye lens is a lens with a focal length less than or equal to 16 mm and a viewing angle greater than or equal to 180°. A panoramic image is an image with a viewing angle greater than a normal effective viewing angle of a human eye, including a black and white image or a color image, etc. For example, a panoramic image may be an image with a viewing angle range greater than 90 degrees in a horizontal direction and a viewing angle range greater than 70 degrees in a vertical direction.

The spherical panoramic image is an image that can show a 360-degree panoramic view in the horizontal direction and a 180-degree panoramic view in the vertical direction. In a specific implementation, the spherical panoramic image can be less than 360 degrees in the horizontal direction, or less than 180 degrees in the vertical direction. The image acquisition device can render the panoramic image through a 3D rendering engine to obtain the spherical panoramic image.

In one embodiment, the panoramic image is an image with an aspect ratio (width:height) of 2:1 and can be formed by stitching together multiple images. For example, a panoramic image may be formed by stitching together two images, each of which having a viewing angle greater than 180 degrees. According to a longitude and latitude expansion method, the spherical panoramic image can be expanded. A width of the expanded image is expressed by latitude, and the latitude range is 0–$2\pi$. A height of the expanded image is expressed by longitude, and the height range is 0–$\pi$. Therefore, the spherical panoramic image can record all information of 360 degrees horizontally and 180 degrees vertically. Among them, the 0° longitude of the spherical surface corresponds to the left and right sides of the equidistant rectangle.

In one embodiment, S202 specifically includes the following steps: acquiring a wide-angle image by capturing a target environment; generating a panoramic image based on the wide-angle image; and rendering the panoramic image according to a spherical model to obtain a spherical panoramic image.

In one embodiment, two fisheye lenses mounted on a UAV are used to photograph an aerial environment of the UAV to obtain two wide-angle images; the wide-angle images are stitched together to obtain a panoramic image.

In one embodiment, two wide-angle lenses on an image acquisition device are used to capture videos of a target environment. According to the frame sequence number, video frames are sequentially extracted from each of the captured videos as wide-angle images. Video frames with the same frame sequence number are stitched to obtain a panoramic image.

S204: cropping the spherical panoramic image based on a preset field of view and an Euler angle corresponding to a rotation attitude of a target object when using the virtual reality device to obtain an image of interest.

Among them, the field of view is an angle used to represent a coverage range of the field of view, and may include a horizontal field of view or a vertical field of view. For example, the horizontal field of view may be 90 degrees, and the vertical field of view may be 70 degrees. The target object may be an object performing immersive scene experience using a virtual reality device, including a real object or a virtual object. The rotation attitude is an attitude in which a specific part of the target object rotates. For example, the rotation attitude may be an attitude in which a head of the target object rotates, or the rotation attitude may be an attitude in which a body of the target object swings, etc. The image of interest is an image in a region of interest when the target object uses a virtual reality device to view a panoramic image. For example, the image of interest may be an image within an effective field of view of the target object. In another example, the image of interest is an image within a 120-degree viewing angle in the horizontal direction and a 60-degree viewing angle in the vertical direction directly in front of the target object.

When the target object rotates, the field of view of the target object viewing the spherical panoramic image using the virtual reality device moves with the rotation of the target object, that is, the region of interest of the target object viewing the image moves with the rotation of the target object. For example, when the target object's head rotates backward, the region of interest moves upward; when the target object's head rotates forward, the region of interest moves downward. The field of view determines a size of the target object's region of interest, and the Euler angle determines a position of the target object's region of interest in the spherical panoramic image. According to the field of view and the Euler angle, the image of interest of the target object can be obtained by cropping the spherical panoramic image.

In one embodiment, the virtual reality device is connected to an image transmission ground terminal through a USB interface, and sends the Euler angle to the image transmission ground terminal through an Android Open Accessory (AOA) Protocol, and the image transmission ground terminal transmits the Euler angle to an image transmission sky terminal through a radio frequency link, and the image transmission sky terminal transmits the Euler angle to the image acquisition device through a Universal Asynchronous Receiver/Transmitter (Uart) protocol. The image transmission sky terminal and the image transmission ground terminal are image transmission devices equipped with image transmission radio frequency antennas, the image transmission sky terminal is mounted on an UAV equipped with an image acquisition device, and the image transmission ground terminal is installed on a local virtual reality device.

S206: stitching the image of interest and a down-sampled wide-angle image to obtain a stitched image, wherein the down-sampled wide-angle image is obtained by down-sampling the wide-angle image.

The stitched image is an image stitched together from the image of interest and the down-sampled wide-angle image. The image acquisition device can stitch the image of interest and the down-sampled wide-angle image according to a preset image arrangement. For example, as shown in FIG. 3, the stitched image is stitched together by the image of interest on the left and the down-sampled wide-angle image on the right. A resolution of the image of interest is 1080×1080, a resolution of the down-sampled wide-angle image is 540×540, and a resolution of the stitched image is 1620×1080.

The image acquisition device down-samples the wide-angle image, and then transmits a stitched image formed by stitching the down-sampled wide-angle image and the image of interest to the virtual reality device, and enables the virtual reality device to display according to the stitched image. Compared with transmitting the wide-angle image to the virtual reality device, the amount of transmitted data is reduced, thereby reducing the required transmission bandwidth.

S208: transmitting the stitched image to a virtual reality device.

The image acquisition device transmits the stitched image to the virtual reality device, which then displays a three-dimensional panoramic image on the screen based on the stitched image, providing the user with an immersive visual experience.

In one embodiment, the image acquisition device transmits the stitched image and the Euler angle to the virtual reality device, so that the virtual reality device displays a three-dimensional panoramic image on the image screen according to the stitched image and the Euler angle.

Figure 4:
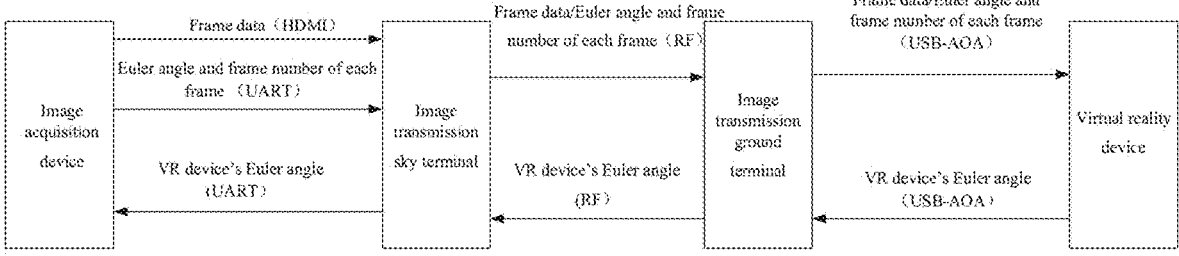
FIG. 4 is a schematic diagram of an image transmission path according to one embodiment.

In one embodiment, as shown in FIG. 4, S208 specifically includes: transmitting the stitched image by the image acquisition device to an image transmission sky terminal through a High Definition Multimedia Interface (HDMI). The Euler angle and the frame number corresponding to the stitched image are transmitted to the image transmission sky terminal through the Uart protocol of a Universal Serial Bus (USB). The image transmission sky terminal performs H.264 or H.265 encoding on the received stitched image and other data to further reduce the amount of data transmitted, and then packages the encoded data into an image data packet, and sends the image data packet to an image transmission ground terminal through a radio frequency (RF) link. The image transmission ground terminal can transmit the image data packet to the virtual reality device through wireless communication (Wi-Fi), socket interface (Socket) or Uart protocol.

In the above embodiment, a wide-angle image obtained by capturing the target environment is obtained, and a panoramic image is generated based on the wide-angle image. The panoramic image is rendered according to a spherical model to obtain a spherical panoramic image, and an image of interest is obtained by cropping the spherical panoramic image based on a preset field of view and the Euler angle corresponding to a rotation attitude of a target object when using the virtual reality device. Thus, a high-definition image of the target object's region of interest can be transmitted to the virtual reality device, so that the virtual reality device displays a high-definition image in the target object's region of interest, thereby ensuring the image display effect of the virtual reality device. Then, the image of interest and the down-sampled wide-angle image are stitched to obtain a stitched image; the down-sampled wide-angle image is obtained by down-sampling the wide-angle image; and the stitched image and the Euler angle are transmitted to the virtual reality device. Since the wide-angle image is down-sampled, the amount of data of the obtained down-sampled wide-angle image is reduced, thereby reducing the transmission bandwidth, and the virtual reality device can also provide a high-definition image display effect under low transmission bandwidth.

In one embodiment, as shown in FIG. 5, S204 specifically includes the following steps:

S502: taking a center of a spherical model as an observation point, and determining a region of interest based on a preset field of view.

Optionally, as shown in FIG. 6, the image acquisition device uses the center of the spherical model as the observation point, and places a virtual camera at the observation point to simulate the eyes of the target object for observation. The shooting area of the camera is a visual range of the target object. The shooting area of the camera is determined according to the field of view, and then the shooting area is projected on the spherical model. The projected area is the region of interest of the target object. For example, assuming the field of view is 60 degrees, the region composed of points A, B, C, and D in FIG. 6 is the region of interest.

S504: rotating the region of interest according to the Euler angle corresponding to the rotation attitude of the target object when using the virtual reality device.

Since the target object can use the virtual reality device in various attitudes, the image acquisition device rotates the region of interest according to the Euler angle, so that the region of interest rotates according to the attitude of the target object, and the rotated region of interest is within the visual range of the target object. For example, when the head of the target object rotates backward, the region of interest moves upward according to the Euler angle of the target object's head rotation. When the head of the target object rotates to the left, the region of interest moves left according to the Euler angle of the target object's head rotation.

S506: based on the rotated region of interest, cropping the spherical panoramic image to obtain the image of interest.

The image acquisition device crops the spherical panoramic image to obtain the image of interest. Since the spherical panoramic image is generated by the wide-angle image without down-sampling, the resolution of the spherical panoramic image is high, and the image of interest cropped from the spherical panoramic image is also a high-definition image, so that the virtual reality device can display the high-definition image in the region of interest that the target object focuses on, ensuring the image display effect of the virtual reality device.

In the above embodiment, the center of the spherical model is used as the observation point, and the region of interest is determined based on the preset field of view. The region of interest is rotated according to the Euler angle corresponding to the rotation attitude of the target object when using the virtual reality device. Based on the rotated region of interest, the image of interest is obtained by cropping the spherical panoramic image. Since the spherical panoramic image is a high-definition image generated from a wide-angle image that has not been down-sampled, the obtained image of interest is also a high-definition image, thereby ensuring that the target object can view the high-definition image in the visual range.

In one embodiment, the down-sampled wide-angle image includes a first image and a second image; S206 specifically includes: stitching the first image and the second image in the up-down direction; stitching the image obtained by stitching in the up-down direction with the image of interest in the left-right direction to obtain a stitched image.

Among them, the first image is a wide-angle image of the left eye perspective, which is obtained by down-sampling the wide-angle image taken by the left eye lens of the fisheye lens. The second image is a wide-angle image of the right eye perspective, which is obtained by down-sampling the wide-angle image taken by the right eye lens of the fisheye lens. The image acquisition device stitches the first image and the second image in the up-down direction, for example, stitching the first image above the second image or stitching the first image below the second image. The image acquisition device stitches the image obtained by stitching in the up-down directions with the image of interest in the left-right direction to obtain a stitched image. For example, after stitching the first image and the second image in the up-down direction, the resulting image is stitched on the left side of the image of interest, or the resulting image is stitched on the right side of the image of interest to obtain a stitched image.

In one embodiment, S206 specifically includes: determining a sampling rate corresponding to the wide-angle image based on the image resolution of the image of interest; down-sampling the wide-angle image according to the sampling rate to obtain a down-sampled wide-angle image; and stitching the image of interest and the down-sampled wide-angle image according to a preset image arrangement mode to obtain a stitched image.

Figure 7:
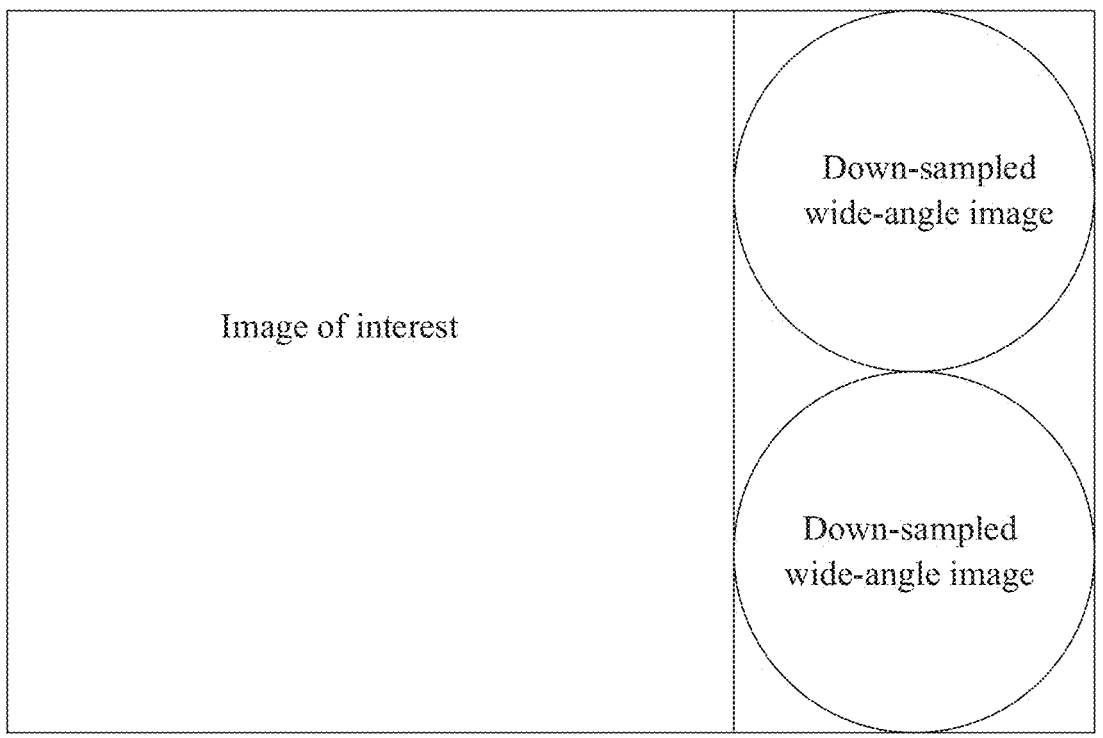
FIG. 7 is a schematic diagram of an image arrangement mode according to one embodiment.

The image arrangement mode is an arrangement mode between the images constituting the stitched image. For example, the image arrangement mode may be a horizontal arrangement mode, a vertical arrangement mode, etc. As shown in FIG. 7, the image arrangement mode is to arrange the image of interest on the left side of the stitched image and two down-sampled wide-angle images in sequence from top to bottom in the vertical direction on the right side of the stitched image. The image acquisition device stitches the image of interest and the down-sampled wide-angle images according to the image arrangement mode, so that the image of interest in the stitched image does not overlap with the down-sampled wide-angle image.

The image acquisition device determines the sampling rate corresponding to the wide-angle image based on the image resolution of the image of interest, so that the resolution of the down-sampled wide-angle image is smaller than that of the image of interest. For example, the resolution of the down-sampled wide-angle image can be half or one-third of that of the image of interest. For example, as shown in FIG. 3, the resolution of the image of interest is 1080×1080, the resolution of the down-sampled wide-angle image is 540×540, and the resolution of the stitched image is 1620×1080.

In the above embodiment, the sampling rate corresponding to the wide-angle image is determined based on the image resolution of the image of interest; the wide-angle image is down-sampled according to the sampling rate, and the image of interest and the down-sampled wide-angle image are stitched to obtain a stitched image. This can reduce the amount of data transmitted to the virtual reality device, and in the case of low transmission bandwidth, the virtual reality device can still have a high image display effect.

In one embodiment, as shown in FIG. 8, an image display method is provided, which is described by taking the method applied to the virtual reality device in FIG. 1 as an example, and includes the following steps:

S802: receiving a stitched image sent by an image acquisition device.

Among them, the stitched image is an image formed by stitching together the image of interest and the down-sampled wide-angle image. For example, as shown in FIG. 3, the stitched image is formed by stitching together the image of interest on the left and the down-sampled wide-angle image on the right. The Euler angle is an angle used to represent the rotation attitude of the target object when using a virtual reality device.

In one embodiment, the virtual reality device receives an image data packet from the image transmission ground terminal, and the image data packet includes a stitched image and an Euler angle sent by the image acquisition device. The frame number is recorded in the user data (sei data) of each frame of the stitched image. Each frame number corresponds to an Euler angle when the image of interest in the stitched image is obtained by cropping.

In one embodiment, the virtual reality device is connected to the image transmission ground terminal through a USB interface, and receives an image data packet from the image transmission ground terminal through an Android Open Accessory (AOA) Protocol. The image data packet is a compressed data packet containing a stitched image and the Euler angle corresponding to the stitched image, and may be a data packet obtained by encoding the stitched image according to the H.264 or H.265 protocol.

S804: obtaining the image of interest and the down-sampled wide-angle image by cropping the stitched image.

Among them, the image of interest is the image in a region of interest when the target object uses a virtual reality device to view the panoramic image. For example, the image of interest is an image in a visual range of the target object. For another example, the image of interest is an image within a 120-degree viewing angle range in the horizontal direction and a 60-degree viewing angle range in the vertical direction directly in front of the target object. The down-sampled wide-angle image is an image obtained by down-sampling the wide-angle image captured by the image acquisition device. Since the image of interest and the down-sampled wide-angle image in the stitched image are arranged according to a preset image arrangement method, the image of interest and the down-sampled wide-angle image can be obtained by cropping the stitched image according to the image arrangement method.

S806: generating a down-sampled panoramic image based on the down-sampled wide-angle image.

Among them, a panoramic image is an image with a viewing angle greater than the normal effective viewing angle of the human eye, including a black and white image or a color image. For example, a panoramic image may be an image with a viewing angle range greater than 90 degrees in the horizontal direction and a viewing angle range greater than 70 degrees in the vertical direction. For example, a panoramic image is an image with a viewing angle of 360 degrees in the horizontal direction and a viewing angle of 180 degrees in the vertical direction. A down-sampled panoramic image is a panoramic image obtained by stitching down-sampled wide-angle images, and has a lower resolution than a panoramic image generated from a wide-angle image.

S808: rendering the down-sampled panoramic image according to a spherical model to obtain a down-sampled spherical panoramic image.

The spherical panoramic image is an image that can achieve a 360-degree panoramic view in the horizontal direction and a 180-degree panoramic view in the vertical direction. In a specific implementation, the spherical panoramic image can be less than 360 degrees in the horizontal direction, or less than 180 degrees in the vertical direction. The down-sampled spherical panoramic image is obtained by rendering the down-sampled panoramic image, and has a lower resolution than the spherical panoramic image obtained by rendering the panoramic image.

S810: based on a preset field of view and an Euler angle corresponding to the stitched image, synthesizing the down-sampled spherical panoramic image and the image of interest, and display the synthesized image on a screen.

The virtual reality device synthesizes the down-sampled spherical panoramic image and the image of interest and displays the synthesized image on the screen. Thus, the high-definition image of interest can be displayed in the region of interest of the target object, and the spherical panoramic image with lower resolution can be displayed in other regions, which ensures the display effect and reduces the amount of transmitted data.

In the above embodiment, the stitched image and the Euler angles corresponding to the stitched image sent by the image acquisition device are received. The image of interest and the down-sampled wide-angle image are obtained by cropping the stitched image; and a down-sampled panoramic image is generated based on the down-sampled wide-angle image. The down-sampled panoramic image is rendered according to the spherical model to obtain a down-sampled spherical panoramic image, and the down-sampled spherical panoramic image and the image of interest are synthesized based on the preset field of view and the Euler angle, and the synthesized image is displayed on the screen. Since the virtual reality device displays an image synthesized by the image of interest and the down-sampled spherical panoramic image on the screen, that is, a high-definition image of interest can be displayed in the target object's region of interest, thereby ensuring the image display effect of the virtual reality device. Since the down-sampled wide-angle image has been down-sampled, the data volume is small, thereby reducing the transmission bandwidth, and the virtual reality device can also provide a high-definition image display effect under low transmission bandwidth conditions.

In one embodiment, as shown in FIG. 9, S710 specifically includes the following steps:

S902: taking the center of the spherical model as an observation point, and generating a plane model based on a preset field of view.

The virtual reality device uses the center of the spherical model as the observation point and renders a plane model in the spherical model based on the preset field of view. The virtual reality device calculates the sine value of half the field of view, multiplies twice the sine value by the radius of the spherical model to obtain the side length of the plane model, and generates the plane model based on the side length of the plane model. Specifically, as shown in FIG. 8, assuming that the radius of the spherical model is R and the field of view is FOV, the side length of the plane model is H=sin (FOV/2)×R×2.

S904: rendering the image of interest on the plane model to obtain a planar image.

The virtual reality device renders the image of interest on the plane model to obtain a planar image. For example, assuming that the image of interest is a 1080×1080 image, a 1080×1080 planar image is rendered. Since the plane model is generated according to the size of the field of view, the size of the planar image rendered on the plane model is the same as the field of view angle range of the target object.

S906: rotating the planar image according to the Euler angle, and superimposing the rotated planar image with the down-sampled spherical panoramic image.

When the target object rotates, the field of view of the target object viewing the spherical panoramic image using the virtual reality device moves with the rotation of the target object. The virtual reality device rotates the planar image according to the Euler angle so that the rotated planar image moves with the attitude of the target object and always remains within the effective visual range of the target object.

In one embodiment, S906 specifically includes: using the rotated planar image as a planar foreground and using the down-sampled spherical panoramic image as a spherical background; and superimposing the planar foreground and the spherical background.

The virtual reality device uses the rotated planar image as the planar foreground, so that the target object can see the high-definition planar foreground, ensuring the viewing effect of the target object. The down-sampled spherical panoramic image is used as the spherical background. Although the resolution of the down-sampled spherical panoramic image is low, it does not affect the viewing of the target object as the background.

In the above embodiment, the center of the spherical model is used as the observation point, and a plane model is generated based on a preset field of view; the image of interest is rendered on the plane model to obtain a planar image; the planar image is rotated according to the Euler angle, and the rotated planar image is superimposed on the down-sampled spherical panoramic image. Thus, the virtual reality device can provide a high-definition image display effect even in the case of low transmission bandwidth.

Figure 10:
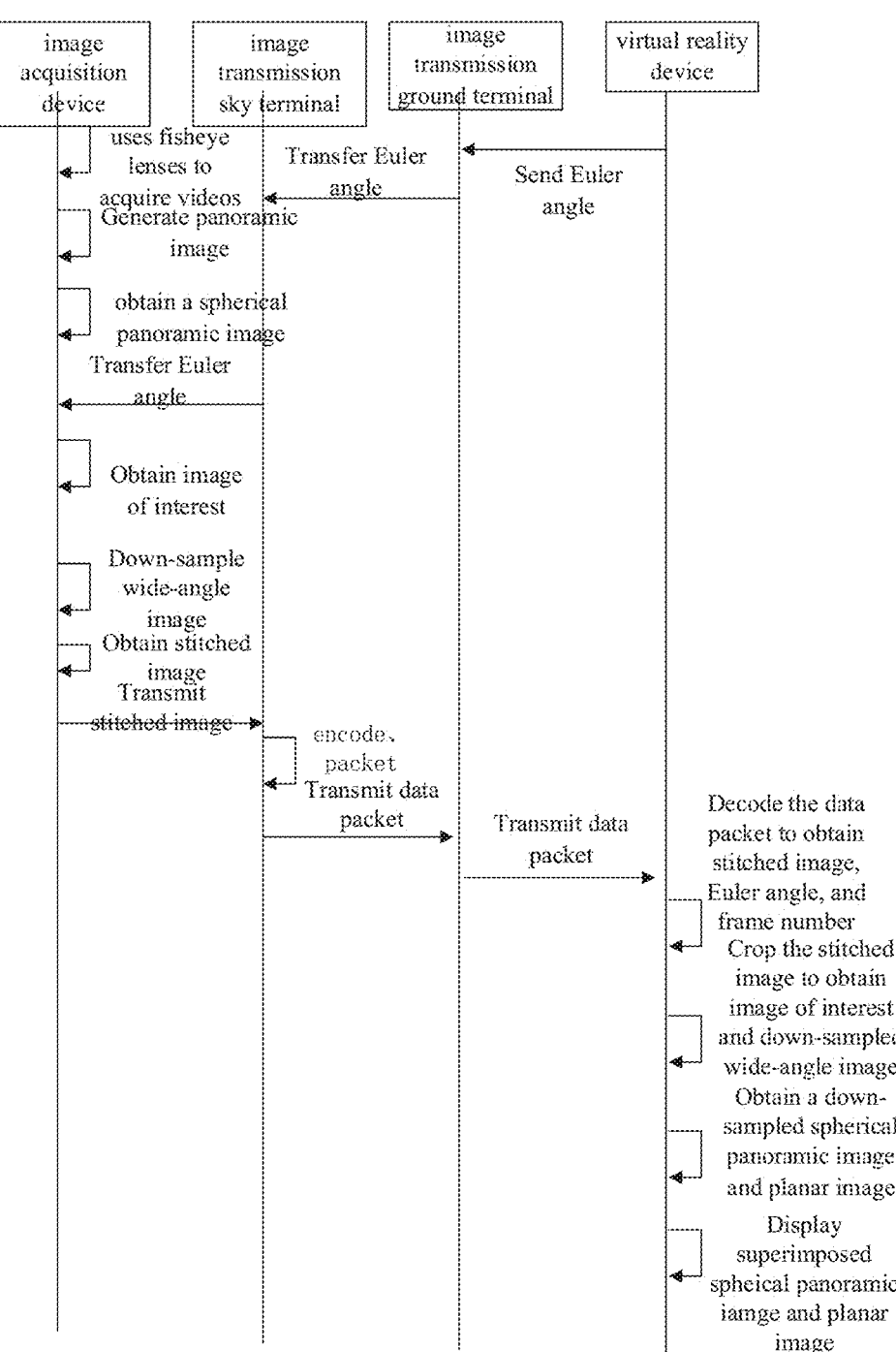
FIG. 10 is a timing diagram of transmitting and displaying an image according to one embodiment.

In one embodiment, as shown in FIG. 10, the image acquisition device respectively uses two fisheye lenses to acquire videos of the target environment. Then, the video frames with the same frame number in each video are stitched into a panoramic image in sequence. The panoramic image is rendered according to a spherical model to obtain a spherical panoramic image. The center of the spherical model is used as the observation point, and the region of interest is determined based on the preset field of view; the region of interest is rotated according to the Euler angle corresponding to the rotation attitude of the target object when using the virtual reality device; based on the rotated region of interest, the image of interest is obtained by cropping the spherical panoramic image. The sampling rate corresponding to the wide-angle image is determined based on the image resolution of the image of interest; the wide-angle image is down-sampled according to the sampling rate to obtain a down-sampled wide-angle image; the image of interest and the down-sampled wide-angle image are stitched according to the preset image arrangement to obtain a stitched image. The stitched image, the Euler angle, and the frame number corresponding to the stitched image are transmitted to the image transmission sky terminal. The image transmission sky terminal packages the stitched image, the Euler angle, and the frame number into a data packet and sends it to the image transmission ground terminal through the radio frequency link, and the image transmission ground terminal transmits the data packet to the virtual reality device. The virtual reality device receives the image data packet sent by the image acquisition device, and decodes the image data packet to obtain the stitched image, the Euler angle corresponding to the stitched image, and the frame number corresponding to the stitched image. The image of interest and the down-sampled wide-angle image are obtained by cropping the stitched image; a down-sampled panoramic image is generated based on the down-sampled wide-angle image; the down-sampled panoramic image is rendered according to the spherical model to obtain a down-sampled spherical panoramic image; the center of the spherical model is used as the observation point, and a plane model is generated based on a preset field of view; the image of interest is rendered on the plane model to obtain a planar image; the corresponding Euler angle is obtained according to the frame number corresponding to the stitched image, and then the planar image is rotated according to the Euler angle, and the rotated plane image is used as the planar foreground, and the down-sampled spherical panoramic image is used as the spherical background. The planar foreground and the spherical background are superimposed, and the superimposed image is displayed on the screen.

It should be understood that, although the steps in the flowcharts involved in the above embodiments are displayed in sequence according to the indication of the arrows, these steps are not necessarily executed in sequence according to the order indicated by the arrows. Unless there is a clear explanation in this disclosure, the execution of these steps is not strictly limited in order, and these steps can be executed in other orders. Moreover, at least a part of the steps in the flowcharts involved in the above embodiments may include multiple steps or multiple stages, and these steps or stages are not necessarily executed at the same time, but can be executed at different times, and the execution order of these steps or stages is not necessarily carried out in sequence, but can be executed in turn or alternately with other steps or at least a part of the steps or stages in other steps.

One embodiment of the present application also provides an image transmission device for implementing the above-mentioned image transmission method. The implementation solution provided by the device to solve the problem is similar to the implementation solution recorded in the above-mentioned method, so the specific limitations in one or more image transmission device embodiments provided below can refer to the limitations on the image transmission method above, and will not be repeated here.

Figure 11:
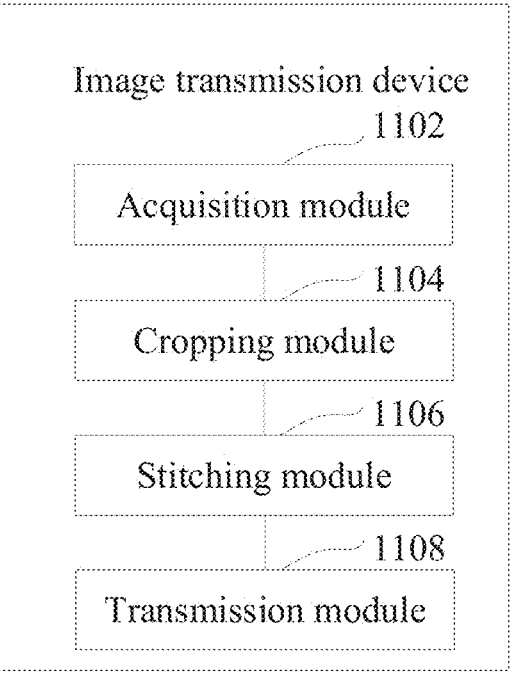
FIG. 11 is a block diagram of a structure of an image transmission device according to one embodiment.

In one embodiment, as shown in FIG. 11, an image transmission device is provided, including: an acquisition module 1102, a cropping module 1104, a stitching module 1106 and a transmission module 1108, wherein:

The acquisition module 1102 is configured to obtain a spherical panoramic image based on a wide-angle image obtained by capturing a target environment;

The cropping module 1104 is configured to obtain an image of interest by cropping the spherical panoramic image based on a preset field of view and an Euler angle corresponding to a rotation attitude of a target object when using a virtual reality device;

The stitching module 1106 is configured to stitch the image of interest with a down-sampled wide-angle image to obtain a stitched image; the down-sampled wide-angle image is obtained by down-sampling the wide-angle image;

The transmission module 1108 is configured to transmit the stitched image and the Euler angle to the virtual reality device.

In the above embodiment, a wide-angle image obtained by capturing the target environment is obtained, and a panoramic image is generated based on the wide-angle image. The panoramic image is rendered according to a spherical model to obtain a spherical panoramic image, and an image of interest is obtained by cropping the spherical panoramic image based on a preset field of view and an Euler angle corresponding to a rotation attitude of a target object when using the virtual reality device. Thus, a high-definition image of the target object's region of interest can be transmitted to the virtual reality device, so that the virtual reality device displays a high-definition image in the target object's region of interest, thereby ensuring the image display effect of the virtual reality device. Then, the image of interest and the down-sampled wide-angle image are stitched to obtain a stitched image; the down-sampled wide-angle image is obtained by down-sampling the wide-angle image; and the stitched image and the Euler angle are transmitted to the virtual reality device. Since the wide-angle image is down-sampled, the amount of data of the obtained down-sampled wide-angle image is reduced, thereby reducing the transmission bandwidth, and the virtual reality device can also provide a high-definition image display effect under low transmission bandwidth.

In one embodiment, the acquisition module 1102 is further configured to:

acquire a wide-angle image of the target environment;

generate a panoramic image based on the wide-angle image; and render the panoramic image according to a spherical model to obtain a spherical panoramic image.

In one embodiment, the down-sampled wide-angle image includes a first image and a second image; the stitching module 1106 is further configured to:

stitch the first image and the second image in an up-down direction; and stitch the image obtained by stitching in the up-down direction and the image of interest in a left-right direction to obtain a stitched image.

In one embodiment, the cropping module 1104 is further configured to:

take a center of a spherical model as an observation point and determine the region of interest based on a preset field of view;

rotate the region of interest according to the Euler angle corresponding to the rotation attitude of the target object when using the virtual reality device; and obtain an image of interest by cropping the spherical panoramic image based on the rotated region of interest.

In one embodiment, the stitching module 1106 is further configured to:

determine a sampling rate corresponding to the wide-angle image based on an image resolution of the image of interest;

down-sampling the wide-angle image according to the sampling rate to obtain a down-sampled wide-angle image;

stitch the image of interest and the down-sampled wide-angle image according to a preset image arrangement to obtain a stitched image.

Figure 12:
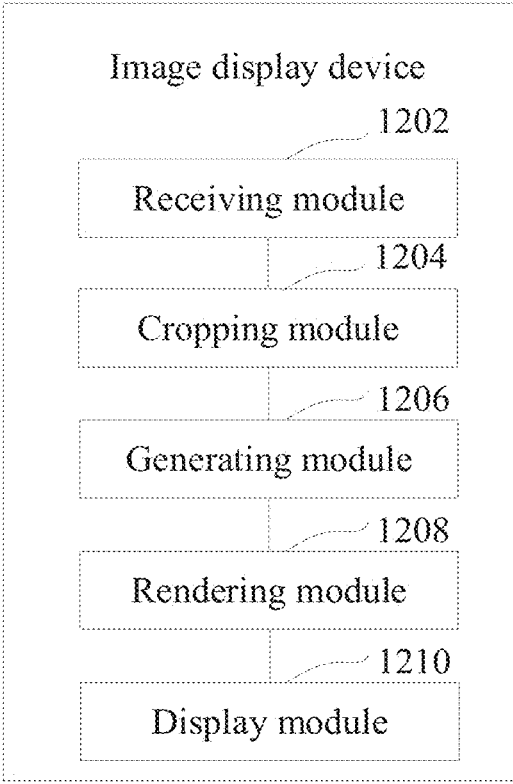
FIG. 12 is a block diagram of a structure of an image display device according to one embodiment.

In one embodiment, as shown in FIG. 12, an image display device is provided, comprising: a receiving module 1202, a cropping module 1204, a generating module 1206, a rendering module 1208 and a display module 1210, wherein:

The receiving module 1202 is configured to receive the stitched image sent by the image acquisition device;

The cropping module 1204 is configured to obtain the image of interest and the down-sampled wide-angle image by cropping the stitched image;

The generating module 1206 is configured to generate a down-sampled panoramic image based on the down-sampled wide-angle image;

The rendering module 1208 is configured to render the down-sampled panoramic image according to the spherical model to obtain a down-sampled spherical panoramic image;

The display module 1210 is configured to synthesize the down-sampled spherical panoramic image and the image of interest based on a preset field of view and the Euler angle corresponding to the stitched image, and display the synthesized image on the screen.

In the above embodiment, a stitched image that the image acquisition device sent is received. The image of interest and the down-sampled wide-angle image are obtained by cropping the stitched image; and a down-sampled panoramic image is generated based on the down-sampled wide-angle image. The down-sampled panoramic image is rendered according to the spherical model to obtain a down-sampled spherical panoramic image, and the down-sampled spherical panoramic image and the image of interest are synthesized based on the preset field of view and the Euler angle corresponding to the stitched image, and the synthesized image is displayed on the screen. Since the virtual reality device displays an image synthesized by the image of interest and the down-sampled spherical panoramic image on the screen, that is, a high-definition image of interest can be displayed in the target object's region of interest, thereby ensuring the image display effect of the virtual reality device. Since the down-sampled wide-angle image has been down-sampled, the data volume is small, thereby reducing the transmission bandwidth, and the virtual reality device can also provide a high-definition image display effect under low transmission bandwidth conditions.

In one embodiment, the display module 1210 is further configured to:

take the center of the spherical model as the observation point, generate a plane model based on a preset field of view;

render the image of interest on the plane model to obtain a planar image; and rotate the planar image according to the Euler angle, and superimpose the rotated planar image with the down-sampled spherical panoramic image.

In one embodiment, the display module 1210 is further configured to:

use the rotated planar image as a planar foreground, and use the down-sampled spherical panoramic image as a spherical background; and superimpose the planar foreground with the spherical background.

The above-mentioned image transmission device and image display device can be implemented in whole or in part by software, hardware and their combination. Each module can be embedded in or independent of the processor in the computer device in the form of hardware, or can be stored in the memory of the computer device in the form of software, so that the processor can call and execute the corresponding operations of each module.

Figure 13:
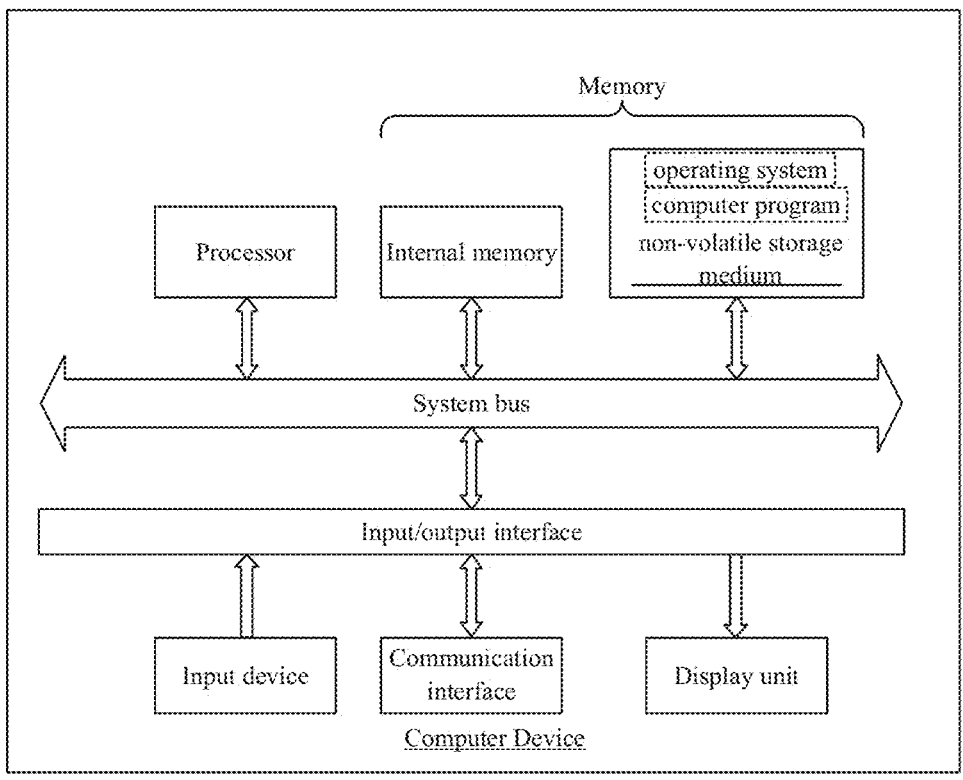
FIG. 13 is a diagram showing an internal structure of a computer device according to one embodiment.

In one embodiment, a computer device is provided, which may be an image acquisition device or a virtual reality device, and its internal structure diagram may be shown in FIG. 13. The computer device includes a processor, a memory, an input/output interface, a communication interface, a display unit, and an input device. The processor, the memory, and the input/output interface are connected via a system bus, and the communication interface, the display unit, and the input device are connected to the system bus via the input/output interface. The processor of the computer device is used to provide computing and control capabilities. The memory of the computer device includes a non-volatile storage medium and an internal memory. The non-volatile storage medium stores an operating system and a computer program. The internal memory provides an environment for the operation of the operating system and the computer program in the non-volatile storage medium. The input/output interface of the computer device is used to exchange information between the processor and an external device. The communication interface of the computer device is used to communicate with an external terminal in a wired or wireless manner, and the wireless manner can be implemented through WIFI, a mobile cellular network, near field communication (NFC) or other technologies. When the computer program is executed by the processor, an image transmission method or an image display method is implemented. The display unit of the computer device is used to form a visually visible image, and can be a display screen, a projection device or a virtual reality imaging device. The display screen can be a liquid crystal display screen or an electronic ink display screen. The input device of the computer device can be a touch layer covered on the display screen, or a button, trackball or touchpad set on the computer device casing, or an external keyboard, touchpad or mouse, etc.

Those skilled in the art will understand that the structure shown in FIG. 13 is merely a block diagram of a partial structure related to the solution of the present application, and does not constitute a limitation on the computer device to which the solution of the present application is applied. The specific computer device may include more or fewer components than shown in the figure, or stitch certain components, or have a different arrangement of components.

In one embodiment, a computer device is provided, including a memory and a processor, wherein a computer program is stored in the memory, and the processor implements the steps in the above-mentioned method embodiments when executing the computer program.

In one embodiment, a computer-readable storage medium is provided, on which a computer program is stored. When the computer program is executed by a processor, the steps in the above method embodiments are implemented.

In one embodiment, a computer program product is provided, including a computer program, which implements the steps in the above method embodiments when executed by a processor.

It should be noted that the user information (including but not limited to user device information, user personal information, etc.) and data (including but not limited to data used for analysis, stored data, displayed data, etc.) involved in this application are all information and data authorized by the user or fully authorized by all parties, and the collection, use and processing of relevant data must comply with relevant laws, regulations and standards of relevant countries and regions.

A person of ordinary skill in the art can understand that all or part of the processes in the above-mentioned embodiment method can be completed by instructing the relevant hardware through a computer program, and the computer program can be stored in a non-volatile computer-readable storage medium. When the computer program is executed, it can implement the processes of the embodiments of the above-mentioned methods. Among them, any reference to the memory, database or other medium used in the embodiments provided in the present application can include at least one of non-volatile and volatile memory. Non-volatile memory can include read-only memory (ROM), magnetic tape, floppy disk, flash memory, optical memory, high-density embedded non-volatile memory, resistive random access memory (ReRAM), magnetic random access memory (MRAM), ferroelectric random access memory (FRAM), phase change memory (PCM), graphene memory, etc. Volatile memory can include random access memory (RAM) or external cache memory, etc. As an illustration and not limitation, RAM can be in various forms, such as static random access memory (SRAM) or dynamic random access memory (DRAM). The database involved in each embodiment provided in this application may include at least one of a relational database and a non-relational database. Non-relational databases may include distributed databases based on blockchains, etc., but are not limited to this. The processor involved in each embodiment provided in this application may be a general-purpose processor, a central processing unit, a graphics processor, a digital signal processor, a programmable logic unit, a data processing logic unit based on quantum computing, circuitry, etc., but are not limited to this.

The technical features of the above embodiments may be arbitrarily combined. To make the description concise, not all possible combinations of the technical features in the above embodiments are described. However, as long as there is no contradiction in the combination of these technical features, they should be considered to be within the scope of this specification.

The above embodiments only express several implementation methods of the present application, and the descriptions thereof are relatively specific and detailed, but they cannot be understood as limiting the scope of the present application. It should be pointed out that, for a person of ordinary skill in the art, several variations and improvements can be made without departing from the concept of the present application, and these all belong to the protection scope of the present application. Therefore, the protection scope of the present application shall be subject to the attached claims.

What is claimed is:

1. An image transmission method, comprising:
obtaining a spherical panoramic image based on a wide-angle image acquired from a target environment;

obtaining an image of interest by cropping the spherical panoramic image based on a preset field of view and an Euler angle corresponding to a rotation attitude of a target object when using a virtual reality device;

stitching the image of interest and a down-sampled wide-angle image to obtain a stitched image, the down-sampled wide-angle image being obtained by down-sampling the wide-angle image; and transmitting the stitched image to the virtual reality device.

2. The method according to claim 1, wherein the obtaining the spherical panoramic image based on the wide-angle image acquired from the target environment comprises:

acquiring the wide-angle image of the target environment by an image acquirer capturing the target environment;

generating a panoramic image based on the wide-angle image; and rendering the panoramic image according to a spherical model to obtain the spherical panoramic image.

3. The method according to claim 2, wherein the acquiring the wide-angle image of the target environment by the image acquirer capturing the target environment and generating the panoramic image based on the wide-angle image comprises:

using two fisheye lenses mounted on an unmanned aerial vehicle (UAV) as the image acquirer to shoot an aerial environment of the UAV to obtain two wide-angle images; and stitching the two wide-angle images to obtain the panoramic image.

4. The method according to claim 2, wherein the acquiring the wide-angle image of the target environment by the image acquirer capturing the target environment and generating the panoramic image based on the wide-angle image comprises:

using two wide-angle lenses on the image acquirer to capture videos of the target environment;

extracting video frames sequentially according to frame sequence numbers from each of the captured videos of the target environment;

stitching video frames having the same sequence number from the extracted video frames to obtain the panoramic image.

5. The method according to claim 1, wherein the down-sampled wide-angle image comprises a first image and a second image; and the stitching the image of interest and the down-sampled wide-angle image to obtain the stitched image comprises:

stitching the first image and the second image in an up-down direction to obtain a third image; and stitching the third image and the image of interest in a left-right direction to obtain the stitched image.

6. The method according to claim 5, wherein the first image is a wide-angle image of a left eye perspective, and the second image is another wide-angle image of a right eye perspective.

7. The method according to claim 1, wherein the obtaining the image of interest by cropping the spherical panoramic image based on the preset field of view and the Euler angle corresponding to the rotation attitude of the target object when using the virtual reality device comprises:

taking a center of a spherical model as an observation point, determining a region of interest based on the preset field of view;

rotating the region of interest according to the Euler angle corresponding to the rotation attitude of the target object when using the virtual reality device to obtain a rotated region of interest; and obtaining the image of interest by cropping the spherical panoramic image based on the rotated region of interest.

8. The method according to claim 7, wherein the image of interest is an image within an effective field of view of the target object.

9. The method according to claim 1, wherein the stitching the image of interest with the down-sampled wide-angle image to obtain the stitched image comprises:

determining a sampling rate corresponding to the wide-angle image based on an image resolution of the image of interest;

down-sampling the wide-angle image according to the sampling rate to obtain the down-sampled wide-angle image; and stitching the image of interest and the down-sampled wide-angle image to obtain the stitched image according to a preset image arrangement mode.

10. The method according to claim 9, wherein the image of interest does not overlap with the down-sampled wide-angle image in the stitched image.

11. The method according to claim 1, wherein a resolution of the down-sampled wide-angle image is smaller than that of the image of interest.

12. An image display method, comprising:

receiving a stitched image transmitted from an image acquirer, the stitched image comprising an image of interest and a down-sampled wide-angle image;

obtaining the image of interest and the down-sampled wide-angle image by cropping the stitched image;

generating a down-sampled panoramic image based on the down-sampled wide-angle image;

rendering the down-sampled panoramic image according to a spherical model to obtain a down-sampled spherical panoramic image;

synthesizing the down-sampled spherical panoramic image and the image of interest to obtain a synthesized image based on a preset field of view and an Euler angle corresponding to the stitched image; and displaying the synthesized image on a screen.

13. The method according to claim 12, wherein a resolution of the down-sampled wide-angle image is smaller than that of the image of interest.

14. The method according to claim 12, wherein the synthesizing the down-sampled spherical panoramic image and the image of interest to obtain the synthesized image based on the preset field of view and the Euler angle corresponding to the stitched image comprises:

taking a center of a spherical model as an observation point;

generating a plane model based on the preset field of view;

rendering the image of interest on the plane model to obtain a planar image;

rotating the planar image according to the Euler angle corresponding to the stitched image, and superimposing the rotated planar image on the down-sampled spherical panoramic image.

15. The method according to claim 14, wherein the superimposing the rotated planar image on the down-sampled spherical panoramic image comprises:

using the rotated planar image as a planar foreground and the down-sampled spherical panoramic image as a spherical background; and superimposing the planar foreground and the spherical background.

16. The method according to claim 12, wherein the screen is on a virtual reality device, and the Euler angle is an angle representing a rotation attitude of a target object when using the virtual reality device.

17. The method according to claim 12, wherein the image of interest is displayed in a region of interest of the target object and the down-sampled spherical panoramic image is displayed in another region other than the region of interest of the target object.

18. A system, comprising an image transmission device; wherein, the image transmission device is configured to:

generate an image of interest based on a wide-angle image obtained by capturing a target environment, based on a preset field of view and rotation information of a virtual reality device;

stitch the image of interest with a down-sampled environment image to obtain a stitched image, the down-sampled environment image obtained by down-sampling the wide-angle image; and transmit the stitched image to the virtual reality device, and wherein the system further comprises the virtual reality device, and the virtual display device is configured to:

obtain the stitched image, the stitched image comprising: the image of interest and the down-sampled environment image;

based on rotation information corresponding to the stitched image, synthesize the down-sampled environment image and the image of interest; and control a screen to display the synthesized image.

19. The system of claim 18, wherein the down-sampled environment image comprises a panoramic image obtained by stitching a plurality of down-sampled wide-angle images.

* * * * *